(12) United States Patent
Gupta et al.

(10) Patent No.: US 10,844,869 B2
(45) Date of Patent: *Nov. 24, 2020

(54) TURBOCHARGER, NOZZLE VANE FOR TURBOCHARGER, AND TURBINE

(71) Applicant: MITSUBISHI HEAVY INDUSTRIES ENGINE & TURBOCHARGER, LTD., Sagamihara (JP)

(72) Inventors: Bipin Gupta, Tokyo (JP); Toyotaka Yoshida, Tokyo (JP); Yosuke Dammoto, Sagamihara (JP); Yoji Akiyama, Sagamihara (JP)

(73) Assignee: MITSUBISHI HEAVY INDUSTRIES ENGINE & TURBOCHARGER, LTD., Sagamihara (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/315,003

(22) PCT Filed: Dec. 21, 2016

(86) PCT No.: PCT/JP2016/088036
§ 371 (c)(1),
(2) Date: Jan. 3, 2019

(87) PCT Pub. No.: WO2018/116394
PCT Pub. Date: Jun. 28, 2018

(65) Prior Publication Data
US 2019/0257243 A1    Aug. 22, 2019

(51) Int. Cl.
*F04D 29/24*    (2006.01)
*F01D 9/04*    (2006.01)
*F02B 37/24*    (2006.01)

(52) U.S. Cl.
CPC ........... *F04D 29/242* (2013.01); *F01D 9/041* (2013.01); *F01D 9/047* (2013.01); *F02B 37/24* (2013.01);
(Continued)

(58) Field of Classification Search
CPC . F01D 1/08; F01D 5/145; F01D 5/148; F01D 5/141; F01D 9/045; F01D 9/048;
(Continued)

(56) References Cited

U.S. PATENT DOCUMENTS 6,755,612 B2    6/2004 Shahpar et al.
9,528,386 B2 *  12/2016 Morita .................... F01D 5/141
(Continued)

FOREIGN PATENT DOCUMENTS

CN            103946487 A       7/2014
DE    10 2009 020 591 A1    11/2010
(Continued)

OTHER PUBLICATIONS

Extended European Search Report dated Dec. 10, 2019 issued in the corresponding European Application No. 16924655.0.
(Continued)

*Primary Examiner* — Courtney D Heinle
*Assistant Examiner* — Sang K Kim
(74) *Attorney, Agent, or Firm* — Birch, Stewart, Kolasch & Birch LLP

(57)    ABSTRACT

A turbocharger includes a turbine wheel, a hub-side wall surface and a shroud-side wall surface which face each other and which together form a flow path for exhaust gas to flow into the turbine wheel, and a plurality of nozzle vanes each of which is rotatably disposed on one of the hub-side wall surface or the shroud-side wall surface in the flow path. A throat formed between adjacent two of the plurality of nozzle vanes has a narrower throat width at a position of a
(Continued)

first end surface of each of the adjacent two nozzle vanes facing the other of the hub-side wall surface or the shroud-side wall surface than a throat width at a middle position between the first end surface and a second end surface on an opposite side to the first end surface of each of the adjacent two nozzle vanes.

8 Claims, 5 Drawing Sheets

(52) U.S. Cl.
CPC .......... *F04D 29/24* (2013.01); *F05D 2220/40* (2013.01); *F05D 2240/128* (2013.01); *Y02T 10/144* (2013.01)

(58) Field of Classification Search
CPC . F01D 9/02; F01D 9/026; F04D 29/24; F04D 29/242; F04D 29/30; F02B 37/24; F05D 2240/121; F05D 2240/122; F05D 2240/123; F05D 2240/124
See application file for complete search history.

(56) References Cited

U.S. PATENT DOCUMENTS

| | | | | |
|---|---|---|---|---|
| 10,072,513 | B2* | 9/2018 | Osako | F01D 17/165 |
| 2005/0220616 | A1* | 10/2005 | Vogiatzis | F01D 5/141 |
| | | | | 415/208.1 |
| 2011/0206500 | A1 | 8/2011 | Nagao et al. | |
| 2014/0341729 | A1 | 11/2014 | Osako et al. | |
| 2019/0101018 | A1* | 4/2019 | Yoshida | F02C 6/12 |

FOREIGN PATENT DOCUMENTS

| | | | |
|---|---|---|---|
| EP | 2797181 | A1 | 10/2014 |
| EP | 3 412 889 | A1 | 12/2018 |
| JP | 11-229815 | A | 8/1999 |
| JP | 2012-21475 | A | 2/2012 |
| JP | 2013-137017 | A | 7/2013 |
| WO | WO 2008/101105 | A2 | 8/2008 |
| WO | WO 2010052911 | A1 | 5/2010 |

OTHER PUBLICATIONS

International Preliminary Report on Patentability and Written Opinion of the International Searching Authority, dated Jul. 4, 2019, for corresponding International Application No. PCT/JP2016/088036, with an English translation of the Written Opinion.
International Search Report, dated Feb. 14, 2017, for International Application No. PCT/JP2016/088036, with an English translation.
Japanese Office Action, dated May 7, 2019, for Japanese Application No. 2018-530168, with an English machine translation.
Extended European Search Repot dated Dec. 10, 2019 issued in the corresponding European Application No. 16924273.2.
International Preliminary Report on Patentability and English translation of the Written Opinion of the International Searching Authority for International Application No. PCT/JP2016/088037, dated Jul. 4, 2019.
International Search Report for International Application No. PCT/JP2016/088037 dated Feb. 21, 2017, with an English translation.
Japanese Notice of Reasons for Refusal dated Apr. 15, 2019, for Japanese Patent Application No. 2018-530930, with machine translation.
Japanese Notice of Reasons for Refusal dated Jul. 16, 2019, for Japanese Patent Application No. 2018-530930, with machine translation.
U.S. Office Action, dated Apr. 2, 2020, for U.S. Appl. No. 16/309,669.
Chinese Office Action dated Apr. 29, 2020 issued in relevant Chinese Application No. 201680087001.1 with a Machine Translation.
Office Action dated Jul. 9, 2020 issued in counterpart Chinese Application No. 201680087714.8 with a machine translation
U.S. Notice of Allowance dated Jul. 30, 2020 for U.S. Appl. No. 16/309,669.

* cited by examiner

TURBOCHARGER, NOZZLE VANE FOR TURBOCHARGER, AND TURBINE

TECHNICAL FIELD

The present disclosure relates a turbocharger, a nozzle vane for a turbocharger, and a turbine.

BACKGROUND ART

A turbocharger including a nozzle vane for adjusting flow of exhaust gas flowing into a turbine rotor blade has been used.

For instance, Patent Document 1 discloses a turbocharger using a radial turbine including a plurality of nozzle vanes arranged in a circumferential direction inside a scroll through which a working gas passes. The nozzle vane used in this turbocharger has opposite nozzle-vane widthwise ends which protrude toward a pressure surface side more prominently at a leading edge and a trailing edge than at a middle portion. Such a shape of the nozzle vane reduces collision loss of the working gas on the leading edge side and equalizes flow of the working gas flowing out from the nozzle on the trailing edge side, thus reducing secondary flow loss in the nozzle vane and the blade.

CITATION LIST

Patent Literature

Patent Document 1: JP2013-137017A

SUMMARY

Problems to be Solved

To improve turbine performance in an operating condition where an exhaust gas flow rate into a turbine is low, a turbocharger using nozzle vanes with variable opening degree is under consideration so as to improve its exhaust gas flow characteristics in a region from a nozzle throat to a turbine rotor blade when the nozzle vanes have a small opening degree.

However, in the operating condition where the nozzle vanes have a small opening degree, the width of the nozzle throat is narrow, and exhaust gas passing through the nozzle throat toward the turbine rotor blade flows with a strong swirling component. Thus, it is difficult to control exhaust gas flow in the above region, and it is difficult to improve turbine efficiency in the operating condition where the nozzle vanes have a small opening degree.

In view of the above, an object of at least one embodiment of the present invention is to provide a turbocharger, a nozzle vane for a turbocharger, and a turbine whereby it is possible to improve turbine efficiency when the nozzle vanes have a small opening degree.

Solution to the Problems (1) A turbocharger according to at least one embodiment of the present invention comprises: a turbine wheel; a hub-side wall surface and a shroud-side wall surface which face each other and which together form a flow path for exhaust gas to flow into the turbine wheel; and a plurality of nozzle vanes each of which is rotatable disposed on one of the hub-side wall surface or the shroud-side wall surface in the flow path, wherein a throat formed between adjacent two of the plurality of nozzle vanes has a narrower throat width at a position of a first end surface of each of the adjacent two nozzle vanes facing the other of the hub-side wall surface or the shroud-side wall surface than a throat width at a middle position between the first end surface and a second end surface on an opposite side to the first end surface of each of the adjacent two nozzle vanes.

According to knowledge of the present inventors, in a turbocharger under an operating condition where nozzle vanes have a small opening degree, swirl is caused by interaction of flow (clearance flow) of exhaust gas passing through a clearance formed between the nozzle vane and a wall surface forming the exhaust gas flow path with flow (throat flow) of exhaust gas passing near the clearance in a throat between the nozzle vanes. This swirl can reduce turbine efficiency.

In this regard, in the above configuration (1), the throat formed between the nozzle vanes has a narrower throat width at the position of the first end surface, which faces the clearance, of the nozzle vane than a throat width at the middle position between opposite end surfaces (the first end surface and the second end surface) of the nozzle vane.

That is, since the throat has a relatively narrow throat width at the first end surface side of the nozzle vane, it is possible to reduce exhaust gas flow passing on the first end surface side of the throat. Thus, it is possible to suppress swirl caused by interaction between the throat flow and the clearance flow. Further, since the throat has a relatively wide throat width in the vicinity of the middle position, it is possible to ensure a throat area even if the nozzle vanes have a small opening degree, and it is possible to ensure a sufficient flow rate of exhaust gas flowing between the nozzle vanes.

Accordingly, with the above configuration (1), even if the nozzle vanes have a small opening degree, it is possible to reduce swirl caused due to interaction between the throat flow and the clearance flow of exhaust gas while ensuring the flow rate of exhaust gas passing through the throat. Thus, it is possible to improve turbine efficiency when the nozzle vanes have a small opening degree.

(2) In some embodiments, in the above configuration (1), the throat width monotonically increases with an increase in a distance from the position of the first end surface toward the middle position.

With the above configuration (2), since the throat width between the position of the first end surface and the middle position is the narrowest at the position of the first end surface and gradually increases from the first end surface toward the middle position, it is possible to effectively reduce exhaust gas flow passing through the throat on the first end surface side while ensuring the throat area. Accordingly, it is possible to effectively reduce swirl caused due to interaction between the throat flow and the clearance flow of exhaust gas while ensuring the flow rate of exhaust gas passing through the throat.

(3) In some embodiments, in the above configuration (1) or (2), the throat is formed between a suction surface on a trailing edge side of one of the adjacent two of the plurality of nozzle vanes and a pressure surface on a leading edge side of the other of the adjacent two of the plurality of nozzle vanes, and the suction surface on the trailing edge side has, in a cross-section including a normal direction of a camber line of the nozzle vane and a vane height direction, a concave shape at least from the position of the first end surface to the middle position.

With the above configuration (3), since the suction surface on the trailing edge side of one of the adjacent nozzle vanes has a concave shape from the position of the first end surface to the middle position, the throat formed by this suction surface and the pressure surface on the leading edge side of the other nozzle vane is likely to have a narrower throat width at the position of the first end surface than a throat width at the middle position, as described in the above (1). Accordingly, it is possible to effectively reduce swirl caused due to interaction between the throat flow and the clearance flow of exhaust gas while ensuring the flow rate of exhaust gas passing through the throat.

(4) In some embodiments, in the above configuration (3), the pressure surface on the leading edge side has, in a cross-section including the normal direction and the vane height direction, a convex shape at least from the position of the first end surface to the middle position, and a radius of curvature of the concave shape of the suction surface on the trailing edge side is smaller than a radius of curvature of the convex shape of the pressure surface on the leading edge.

With the above configuration (4), since the suction surface on the trailing edge side of one of the adjacent nozzle vanes and the pressure surface on the leading edge side of the other nozzle vane have a concave shape and a convex shape respectively from the position of the first end surface to the middle position, as well as a radius of curvature of the concave shape of the suction surface on the trailing edge side is smaller than a radius of curvature of the convex shape of the pressure surface on the leading edge, the throat width at the position of the first end surface is narrower than the throat width at the middle position, as described in the above (1). Accordingly, it is possible to effectively reduce swirl caused due to interaction between the throat flow and the clearance flow of exhaust gas while ensuring the flow rate of exhaust gas passing through the throat.

(5) In some embodiments, in any one of the above configurations (1) to (4), when an x-axis is taken along a normal direction of a camber line of the nozzle vane from a pressure surface toward a suction surface of the nozzle vane, and a y-axis is taken along a vane height direction from the second end surface toward the first end surface, coordinates $(x_s, y_s)$ of the suction surface on a trailing edge side of the nozzle vane and coordinates $(x_p, y_p)$ of the pressure surface on a leading edge side of the nozzle vane satisfy the following relational expression within a positional range in the vane height direction including the first end surface:

$$\frac{dy_s}{dx_s} < \frac{dy_p}{dx_p} \qquad \text{(Expression 1)}$$

In the above configuration (5), the slope $(dy_s/dx_s)$ of the suction surface on the trailing edge side of the nozzle vane is smaller than the slope $(dy_p/dx_p)$ of the pressure surface on the leading edge side of the nozzle vane within the positional range in the vane height direction (y-axis direction) including the first end surface. Thus, the throat formed between the nozzle vanes has a narrower throat width at the position of the first end surface of the nozzle vane facing the clearance than a throat width at a position between the first end surface and the second end surface.

That is, since the throat has a relatively narrow throat width at the position of the first end surface of the nozzle vane, it is possible to reduce exhaust gas flow on the first end surface side of the throat. Thus, it is possible to suppress swirl caused by interaction between the throat flow and the clearance flow. Further, since the throat has a relatively wide throat width at a position between the first end surface and the second end surface, it is possible to ensure a throat area even if the nozzle vanes have a small opening degree, and it is possible to ensure a sufficient flow rate of exhaust gas flowing between the nozzle vanes.

Accordingly, with the above configuration (5), even if the nozzle vanes have a small opening degree, it is possible to reduce swirl caused due to interaction between the throat flow and the clearance flow of exhaust gas while ensuring the flow rate of exhaust gas passing through the throat. Thus, it is possible to improve turbine efficiency when the nozzle vanes have a small opening degree.

(6) A nozzle vane for a turbocharger according to at least one embodiment of the present invention comprises: a vane body having a first end surface and a second end surface; and a rotatable shaft to rotate the vane body, the rotatable shaft being disposed on the second end surface, wherein when an x-axis is taken along a normal direction of a camber line of the vane body from a pressure surface toward a suction surface of the vane body, and a y-axis is taken along a vane height direction from the second end surface toward the first end surface, coordinates $(x_s, y_s)$ of the suction surface on a trailing edge side of the vane body and coordinates $(x_p, y_p)$ of the pressure surface on a leading edge side of the vane body satisfy the following relational expression within a positional range in the vane height direction including the first end surface:

$$\frac{dy_s}{dx_s} < \frac{dy_p}{dx_p} \qquad \text{(Expression 2)}$$

In the above configuration (6), the slope $(dy_s/dx_s)$ of the suction surface on the trailing edge side of the vane body is smaller than the slope $(dy_p/dx_p)$ of the pressure surface on the leading edge side of the vane body within the positional range in the vane height direction (y-axis direction) including the first end surface. Thus, when the nozzle vanes in the above (6) are provided in the turbocharger, the throat formed between the nozzle vanes has a narrower throat width at the position of the first end surface of the vane body facing the clearance than a throat width at a position between the first end surface and the second end surface.

That is, since the throat has a relatively narrow throat width at the position of the first end surface of the nozzle vane, it is possible to reduce exhaust gas flow on the first end surface side of the throat. Thus, it is possible to suppress swirl caused by interaction between the throat flow and the clearance flow. Further, since the throat has a relatively wide throat width at a position between the first end surface and the second end surface, it is possible to ensure a throat area even if the nozzle vanes have a small opening degree, and it is possible to ensure a sufficient flow rate of exhaust gas flowing between the nozzle vanes.

Accordingly, with the above configuration (6), even if the nozzle vanes have a small opening degree, it is possible to reduce swirl caused due to interaction between the throat flow and the clearance flow of exhaust gas while ensuring the flow rate of exhaust gas passing through the throat. Thus, it is possible to improve turbine efficiency when the nozzle vanes have a small opening degree.

(7) In some embodiments, in the above configuration (6), the suction surface on the trailing edge side has, in a cross-section including the normal direction of the camber line and the vane height direction, a concave shape at least from a position of the first end surface to a middle position between the first end surface and the second end surface.

With the above configuration (7), since the suction surface on the trailing edge side of one of the adjacent nozzle vanes has a concave shape from the position of the first end surface to the middle position, the throat formed by this suction surface and the pressure surface on the leading edge of the other nozzle vane is likely to have a narrower throat width at the position of the first end surface than a throat width at the middle position, as described in the above (6). Accordingly, it is possible to effectively reduce swirl caused due to interaction between the throat flow and the clearance flow of exhaust gas while ensuring the flow rate of exhaust gas passing through the throat.

(8) In some embodiments, in the above configuration (7), the pressure surface on the leading edge side has, in a cross-section including the normal direction and the vane height direction, a convex shape at least from the position of the first end surface to the middle position, and a radius of curvature of the concave shape of the suction surface on the trailing edge side is smaller than a radius of curvature of the convex shape of the pressure surface on the leading edge.

With the above configuration (8), since the suction surface on the trailing edge side of one of the adjacent nozzle vanes and the pressure surface on the leading edge side of the other nozzle vane have a concave shape and a convex shape respectively from the position of the first end surface to the middle position, as well as a radius of curvature of the concave shape of the suction surface on the trailing edge side is smaller than a radius of curvature of the convex shape of the pressure surface on the leading edge, the throat width at the position of the first end surface is narrower than the throat width at the middle position, as described in the above (6). Accordingly, it is possible to effectively reduce swirl caused due to interaction between the throat flow and the clearance flow of exhaust gas while ensuring the flow rate of exhaust gas passing through the throat.

(9) A turbine according to at least one embodiment of the present invention comprises: the nozzle vane described in any one of the above (6) to (8) and a turbine wheel disposed on a downstream side of the nozzle vane.

In the above configuration (9), the slope ($dy_s/dx_s$) of the suction surface on the trailing edge side of the vane body of each nozzle vane is smaller than the slope ($dy_p/dx_p$) of the pressure surface on the leading edge side of the vane body within the positional range in the vane height direction (y-axis direction) including the first end surface. Thus, the throat formed between the nozzle vanes has a narrower throat width at the position of the first end surface of the vane body facing the clearance than a throat width at a position between the first end surface and the second end surface.

That is, since the throat has a relatively narrow throat width at the position of the first end surface of the nozzle vane, it is possible to reduce exhaust gas flow on the first end surface side of the throat. Thus, it is possible to suppress swirl caused by interaction between the throat flow and the clearance flow. Further, since the throat has a relatively wide throat width at a position between the first end surface and the second end surface, it is possible to ensure a throat area even if the nozzle vanes have a small opening degree, and it is possible to ensure a sufficient flow rate of exhaust gas flowing between the nozzle vanes.

Accordingly, with the above configuration (9), even if the nozzle vanes have a small opening degree, it is possible to reduce swirl caused due to interaction between the throat flow and the clearance flow of exhaust gas while ensuring the flow rate of exhaust gas passing through the throat. Thus, it is possible to improve turbine efficiency when the nozzle vanes have a small opening degree.

(10) A turbocharger according to at least one embodiment of the present invention comprises: a turbine wheel; a hub-side wall surface and a shroud-side wall surface which face each other and which together form a flow path for exhaust gas to flow into the turbine wheel; and the nozzle vanes described in any one of the above (6) to (8), each of which is rotatably disposed in the flow path.

In the above configuration (10), the slope ($dy_s/dx_s$) of the suction surface on the trailing edge side of the vane body of each nozzle vane is smaller than the slope ($dy_p/dx_p$) of the pressure surface on the leading edge side of the vane body within the positional range in the vane height direction (y-axis direction) including the first end surface. Thus, the throat formed between the nozzle vanes has a narrower throat width at the position of the first end surface of the vane body facing the clearance than a throat width at a position between the first end surface and the second end surface.

That is, since the throat has a relatively narrow throat width at the position of the first end surface of the nozzle vane, it is possible to reduce exhaust gas flow on the first end surface side of the throat. Thus, it is possible to suppress swirl caused by interaction between the throat flow and the clearance flow. Further, since the throat has a relatively wide throat width at a position between the first end surface and the second end surface, it is possible to ensure a throat area even if the nozzle vanes have a small opening degree, and it is possible to ensure a sufficient flow rate of exhaust gas flowing between the nozzle vanes.

Accordingly, with the above configuration (10), even if the nozzle vanes have a small opening degree, it is possible to reduce swirl caused due to interaction between the throat flow and the clearance flow of exhaust gas while ensuring the flow rate of exhaust gas passing through the throat. Thus, it is possible to improve turbine efficiency when the nozzle vanes have a small opening degree.

Advantageous Effects

At least one embodiment of the present invention provides a turbocharger, a nozzle vane for a turbocharger, and a turbine whereby it is possible to improve turbine efficiency when the nozzle vanes have a small opening degree.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

First, an overall configuration of a turbocharger according to some embodiments will be described.

Figure 1:
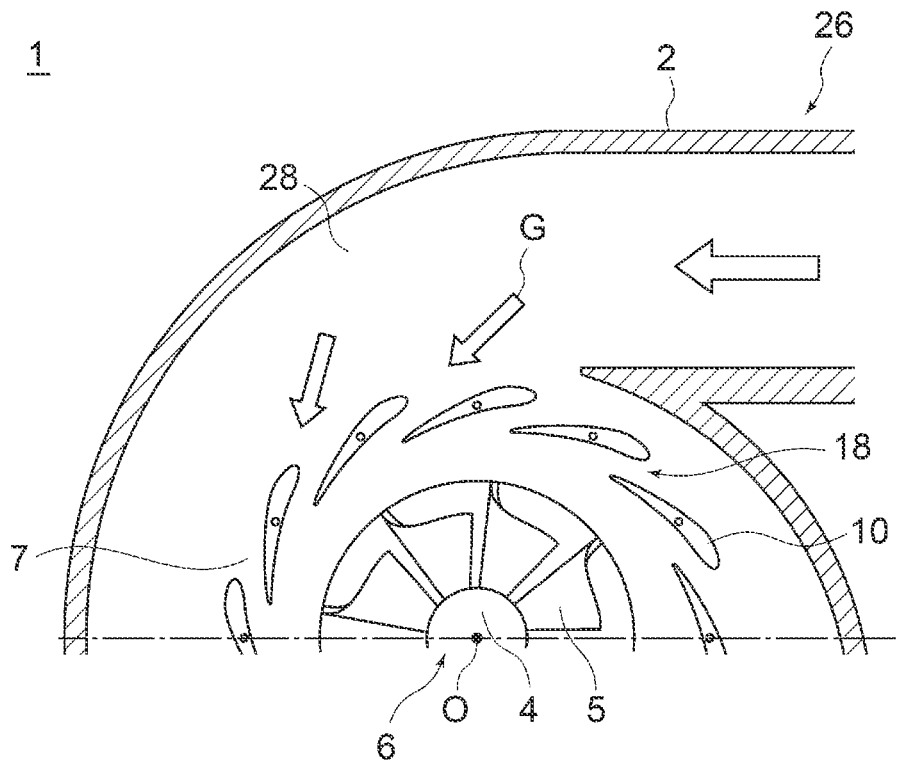
FIG. 1 is a schematic cross-sectional view of main part of an upper half of a turbocharger according to an embodiment.
Figure 2:
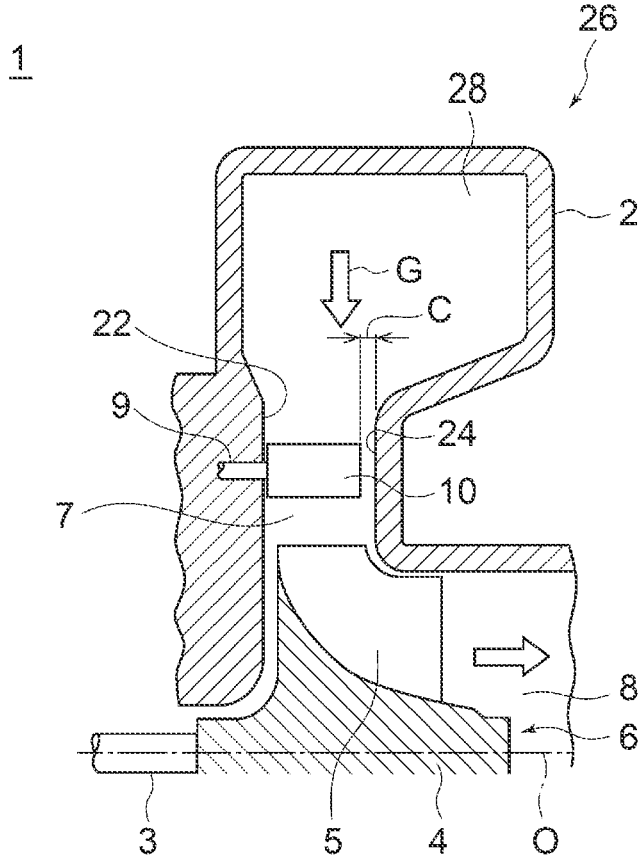
FIG. 2 is a schematic cross-sectional view of a turbocharger according to an embodiment, taken along the rotational axis direction.

FIG. 1 is a schematic cross-sectional view of main part of an upper half of a turbocharger according to an embodiment. FIG. 2 is a schematic cross-sectional view of a turbocharger according to an embodiment, taken along the direction of a rotational axis O.

As shown in FIGS. 1 and 2, the turbocharger 1 includes a turbine 26 having a turbine wheel 6 configured to be rotationally driven by exhaust gas from an engine (not shown) and a compressor (not shown) connected to the turbine 26 via a rotational shaft 3. The compressor is configured to be coaxially driven by rotation of the turbine wheel 6 to compress intake air flowing into the engine.

While the turbine 26 shown in FIGS. 1 and 2 is a radial inflow axial-flow turbine into which exhaust gas as a working fluid enters in the radial direction, the operation system of the turbine 26 is not limited thereto. For instance, in some embodiments, the turbine 26 may be a mixed flow turbine in which a working fluid has velocity components in the radial direction and the axial direction.

The turbine wheel 6 includes a hub 4 connected to the rotational shaft 3 and a plurality of blades 5 disposed in the circumferential direction of an outer peripheral surface of the hub 4. The turbine wheel 6 is accommodated in a turbine housing 2. The turbine housing 2 forms a scroll flow path 28, into which exhaust gas from the engine enters, on a radially outer side of the turbine wheel 6. Further, as shown in FIG. 2, a flow path 7 for exhaust gas to flow into the turbine wheel 6 from the scroll flow path 28 is formed on a radially inner side of the scroll flow path 28 by a hub-side wall surface 22 and a shroud-side wall surface 24 of wall surfaces of the turbine housing 2 which face each other. The hub-side wall surface 22 is a wall surface situated on a radially inner side (adjacent to the hub 4) of the blades 5; the shroud-side wall surface 24 is a wall surface situated on a radially outer side (away from the hub 4) of the blades 5.

In the illustrative embodiment shown in FIGS. 1 and 2, a plurality of nozzle vanes (vane bodies) 10 are each rotatably disposed on the hub-side wall surface 22 via a rotatable shaft 9 in the flow path 7. When the rotatable shaft 9 rotates, the blade angle of the nozzle vane 10 is changed. This enables adjustment of the opening degree of the nozzle vane 10.

A clearance C (see FIG. 2) is formed between the nozzle vane 10 and the shroud-side wall surface 24 which faces the hub-side wall surface 22 provided with the rotatable shaft 9 of the nozzle vane 10. The clearance C is provided to have a sufficient size to smoothly slide the nozzle vane 10 over the wall surface.

In another embodiment, the nozzle vanes 10 may be disposed on the shroud-side wall surface 24, and the clearance C may be formed between the nozzle vane 10 and the hub-side wall surface 22 which faces the shroud-side wall surface 24.

Alternatively, in another embodiment, the nozzle vanes 10 may be rotatably supported on both of the hub-side wall surface 22 and the shroud-side wall surface 24 via rotatable shafts disposed on both end surfaces on the hub side and, the shroud side of each of the nozzle vanes 10. In this case, the clearance may be formed between the hub-side wall surface 22 and the nozzle vane 10 or between the shroud-side wall surface 24 and the nozzle vane 10 or may be formed both between the hub-side wall surface 22 and the nozzle vane 10 and between the shroud-side wall surface 24 and the nozzle vane 10.

In the turbocharger 1 with the above configuration, exhaust gas G from the scroll flow path 28 flows into the flow path 7 formed between the hub-side wall surface 22 and the shroud-side wall surface 24, and its flow direction is controlled by the nozzle vanes 10 so that the exhaust gas G flows into the turbine wheel 6 to rotationally drive the turbine wheel 6. Then, the exhaust gas used in the turbine wheel 6 is discharged to the outside from an outlet 8.

In the above turbocharger 1, a throat 18 (see FIG. 1) is formed between adjacent two of the plurality of nozzle vanes 10, at a position where a distance between the adjacent two nozzle vanes is the shortest.

The nozzle vanes 10 and the throat 18 formed between adjacent two nozzle vanes 10 in the turbocharger 1 according to some embodiments will now be described in more detail.

Figure 3A:
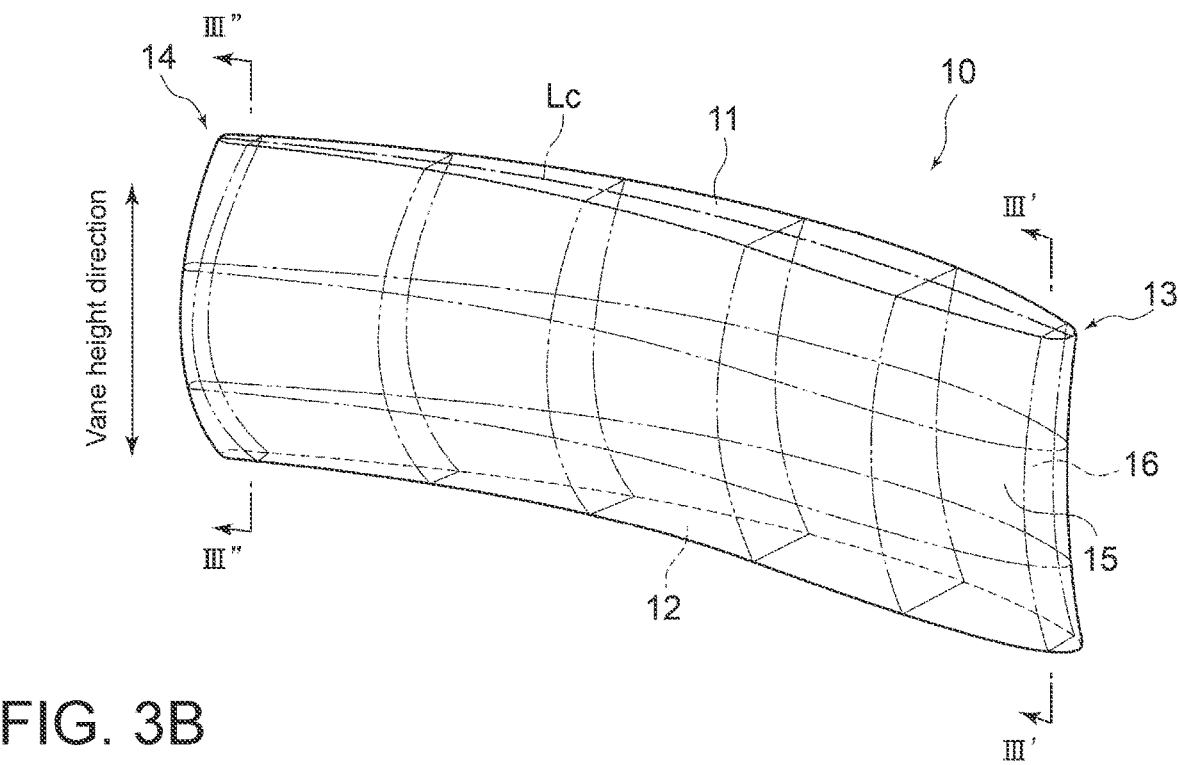
FIG. 3A is a perspective view of a nozzle vane (vane body) according to an embodiment.
Figure 3B:
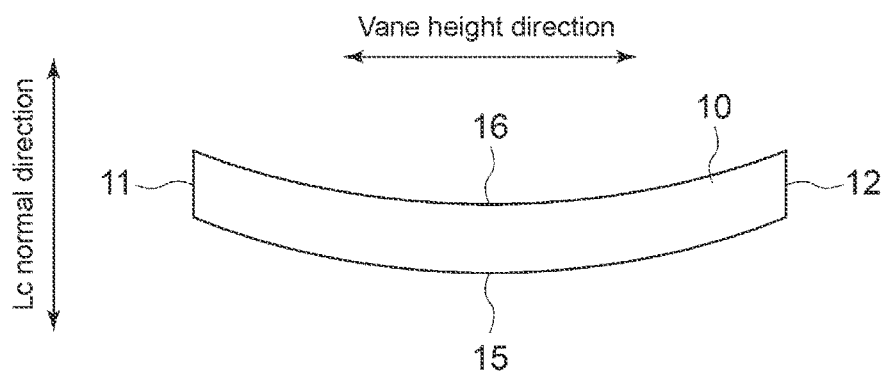
FIG. 3B is a cross-sectional view of the nozzle vane shown in FIG. 3A on the leading edge side.
Figure 3C:
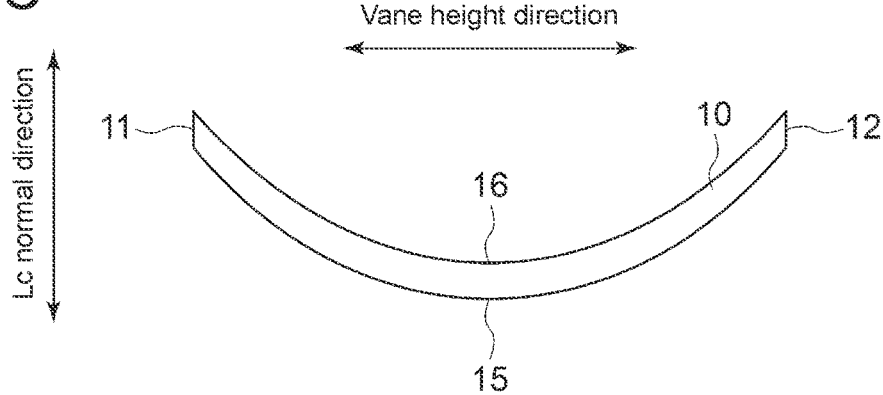
FIG. 3C is a cross-sectional view of the nozzle vane shown in FIG. 3A on the trailing edge side.
Figure 4:
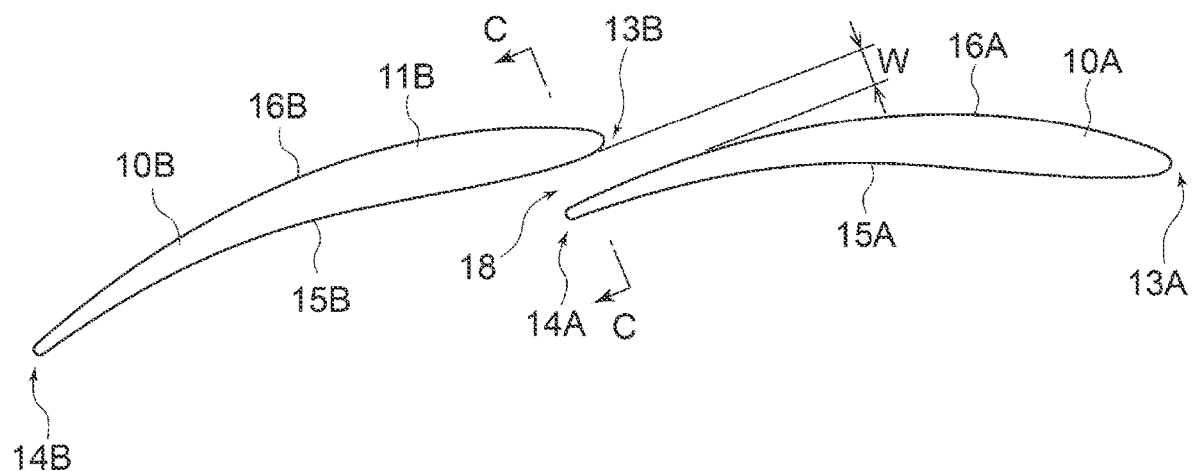
FIG. 4 is a configuration diagram of adjacent nozzle vanes in a turbocharger.

FIG. 3A is a perspective view of the nozzle vane (vane body) 10 according to an embodiment. FIG. 3B is a cross-sectional view of the nozzle vane 10 shown in FIG. 3A on the leading edge side (cross-sectional view taken along III'-III' of FIG. 3A), FIG. 3C is a cross-sectional view of the nozzle vane 10 shown in. FIG. 3A on the trailing edge side (cross-sectional view taken along III"-III" of FIG. 3A). FIG. 4 is a configuration diagram of adjacent nozzle vanes 10 in the turbocharger 1.

FIGS. 3B and 3C are each a cross-sectional view taken along a plane including a normal direction of a camber line Lc of the nozzle vane 10 and a vane height direction (direction connecting a shroud-side end surface 11 and a hub-side end surface 12).

As shown in FIGS. 3A to 3C, when the nozzle vane 10 is provided in the turbocharger 1, the nozzle vane (vane body) 10 has a shroud-side end surface 11 facing the shroud-side wall surface 24, a hub-side end surface 12 facing the hub-side wall surface 22, and an airfoil portion extending between the shroud-side end surface 11 and the hub-side end surface 12. Additionally, the nozzle vane 10 has a leading edge 13 and a trailing edge 14 from the shroud-side end surface 11 to the hub-side end surface 12. Additionally, the nozzle vane 10 has a pressure surface 15 extending from the leading edge 13 to the trailing edge 14 and a suction surface 16 extending from the leading edge 13 to the trailing edge 14 and opposite to the pressure surface 15.

The following description will be made in conjunction with an embodiment in which the nozzle vane (vane body) 10 is rotatably disposed on the hub-side wall surface 22, as shown in FIG. 2. Accordingly, in the following description, the shroud-side end surface 11 of both end surfaces of the nozzle vane 10 is a first end surface facing the shroud-side wall surface 24 (an end surface facing the clearance C) and the hub-side end surface 12 opposite to the shroud-side end surface 11 (first end surface) is a second end surface (an end surface on which the rotatable shaft 9 is disposed).

In another embodiment, the nozzle vane (vane body) 10 may be rotatably disposed on the shroud-side wall surface 24, and the clearance C may be formed between the hub-side wall surface 22 and the nozzle vane 10. In this case, the hub-side end surface 12 facing, the clearance C is the first end surface, and the shroud-side end surface 11 on which the rotatable shaft 9 is disposed is the second end surface. Further, in this case, the same description as below can apply by changing description on the hub-side with description on the shroud side.

As shown in FIG. 3B, in the nozzle vane 10 shown in FIG. 3A, the pressure surface 15 on the leading edge 13 side has a convex shape from the shroud-side end surface 11 to the hub-side end surface 12 in the vane height direction. Additionally, as shown in FIG. 3C, in the nozzle vane 10 shown in FIG. 3A, the suction surface 16 on the trailing edge 14 side has a concave shape from the shroud-side end surface 11 to the hub-side end surface 12 in the vane height direction.

In the nozzle vane 10 shown in FIG. 3A, the pressure, surface 15 has a convex shape and the suction surface 16 has a concave shape from the shroud-side end surface 11 to the hub-side end surface 12 in the vane height direction, as well as from the leading edge 13 to the trailing edge 14.

Further, in the nozzle vane 10 shown in FIG. 3A, a radius $RC_T$ of curvature of the concave shape of the suction surface 16 on the trailing edge 14 side is smaller than a radius $RC_L$ of curvature of the convex shape of the pressure surface 15 on the leading edge 13 side.

When multiple nozzle vanes 10 shown in FIGS. 3A to 3C are provided in the turbocharger 1, as shown in FIG. 4, the throat 18 is formed between adjacent two 10A, 10B of the nozzle vanes 10. The throat 18 is formed between the suction surface 16 on the trailing edge 14A side of the nozzle vane 10A and the pressure surface 15B on the leading edge 13B side of the nozzle vane 10B. The throat 18 is formed at a position where a distance W between the adjacent nozzle vanes 10A and 10B is the shortest.

The nozzle vanes 10A, 10B shown in FIG. 4 each have the configuration of the above-described nozzle vane (vane body) 10. Each has a shroud-side end surface 11A, 11B, a hub-side end surface 12A, 12B, a leading edge 13A, 13B, a trailing edge 14A, 14B, a pressure surface 15A, 15B, and a suction surface 16A, 16B.

Figure 5:
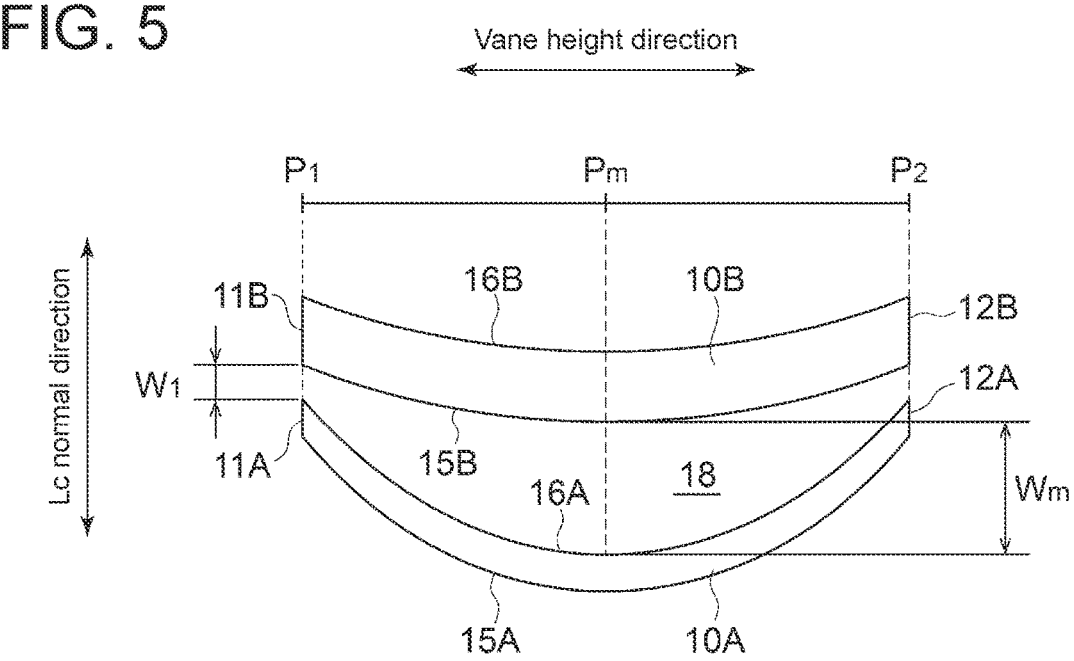
FIG. 5 is a cross-sectional view of adjacent nozzle vanes at a position of a throat according to an embodiment.

FIG. 5 is a cross-sectional view of the adjacent nozzle vanes 10A, 10B having a shape shown in FIGS. 3A to 3C at a position of the throat 18 (corresponding to the cross-sectional view taken along C-C of FIG. 4).

Figure 6:
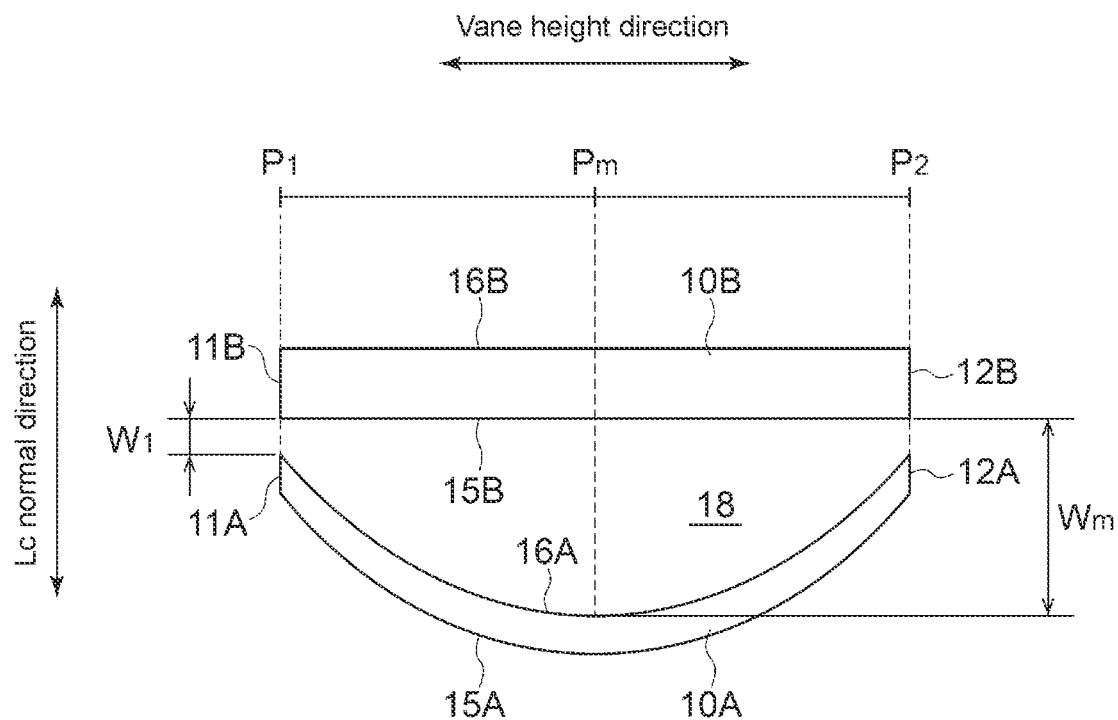
FIG. 6 is a cross-sectional view of adjacent nozzle vanes at a position of a throat according to an embodiment.
Figure 7:
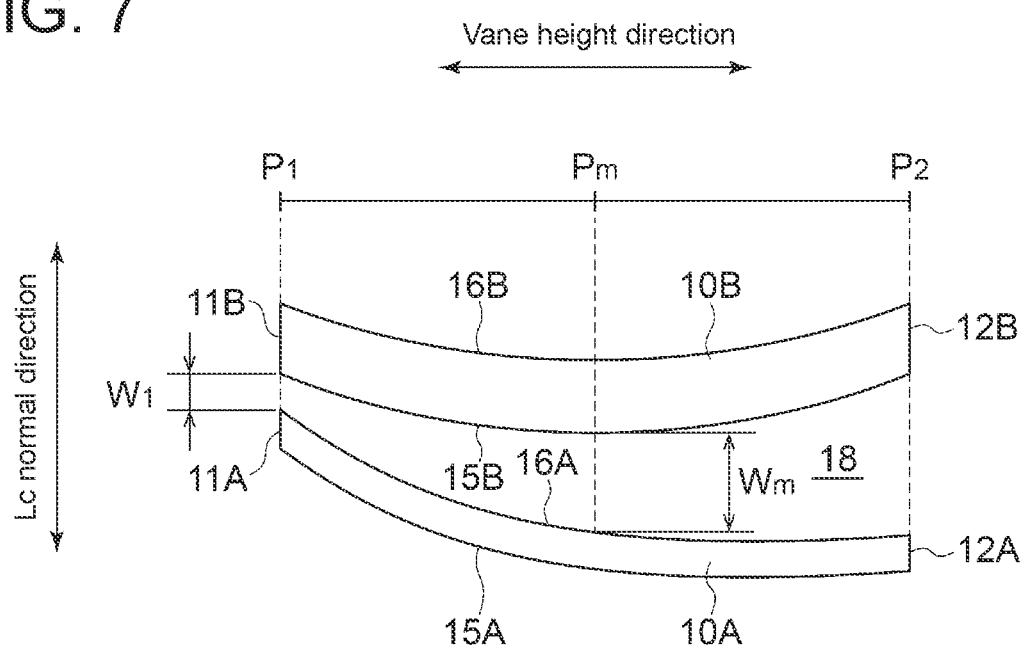
FIG. 7 is a cross-sectional view of adjacent nozzle vanes at a position of a throat according to an embodiment.

FIGS. 6 and 7 are each a cross-sectional view of the adjacent nozzle vanes 10A, 10B according to anther embodiment at a position of the throat 18 (corresponding to the cross-sectional view taken along C-C of FIG. 4). The nozzle vane 10A and the nozzle vane 10B shown in FIGS. 6 and 7 may have the same shape throughout.

FIGS. 5 to 7 are each a cross-sectional view taken along a plane including the normal direction of the camber line Lc of the nozzle vane 10 and the vane height direction (direction connecting the shroud-side end surface 11 and the hub-side end surface 12).

The following description premises that the adjacent nozzle vanes 10A and 10B have the same shape. The nozzle vanes 10A and 10B are also collectively referred to as the nozzle vane 10.

In the nozzle vanes 10 (10A and 10B) shown in FIG. 6, the pressure surface 15 on the leading edge 13 side has a flat shape and the suction surface 16 on the trailing edge 14 side has a concave shape from the shroud-side end surface 11 to the hub-side end surface 12 in the vane height direction. The concave shape of the suction surface 16 on the trailing edge 14 side has a peak projecting toward the pressure surface 15 side in the vicinity of a middle position. Pm between a position $P_1$ of the shroud-side end surface 11 and a position $P_2$ of the hub-side end surface 12 in the vane height direction.

In the nozzle vanes 10 (10A and 10B) shown in FIG. 7, the pressure surface 15 on the leading edge 13 side has a convex shape and the suction surface 16 on the trailing edge 14 side has a concave shape from the shroud-side end surface 11 to the hub-side end surface 12 in the vane height direction. The convex shape of the pressure surface 15 on the leading edge 13 side has a peak projecting toward the pressure surface 15 side in the vicinity of a middle position Pm between a position $P_1$ of the shroud-side end surface 11 and a position $P_2$ of the hub-side end surface 12 in the vane height direction. The concave shape of the suction surface 16 on the trailing edge 14 side gradually projects toward the pressure surface 15 side from the shroud-side end surface 11 to the hub-side end surface 12 in the vane height direction.

In the nozzle vanes (10A and 10B) shown in FIG. 5, the convex shape of the pressure surface 15 on the leading edge 13 side and the concave shape of the suction surface 16 on the trailing edge 14 side each have a peak projecting toward the pressure surface 15 side in the vicinity of a middle position Pm between a position. $P_1$ of the shroud-side end surface 11 and a position $P_2$ of the hub-side end surface 12 in the vane height direction.

In some embodiments, as shown in FIGS. 5 to 7, in the throat 18 formed between the adjacent nozzle vanes 10N 10B, a throat width $W_1$ at the position $P_1$ of the shroud-side end surface 11 (first end surface facing the clearance) is narrower than a throat with Wm at the middle position Pm between the position $P_1$ of the shroud-side end surface 11 (first end surface) and the position $P_2$ of the hub-side end surface (second end surface) (i.e., $W_1$<Wm).

Figure 9:
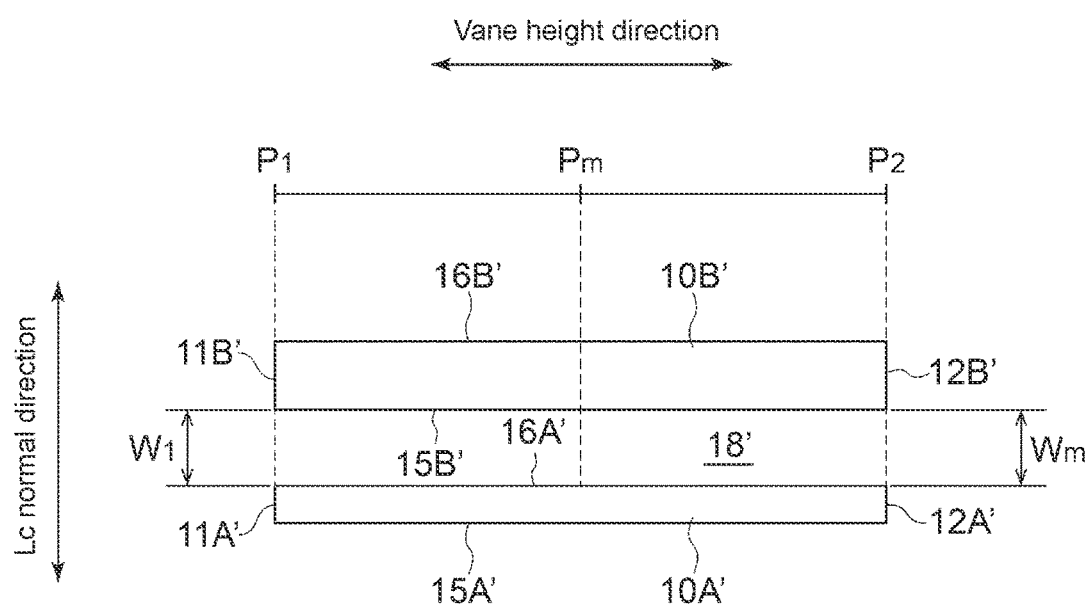
FIG. 9 is a cross-sectional view of typical adjacent nozzle vanes at a position of a throat.

FIG. 9 is a cross-sectional view of typical adjacent nozzle vanes at a position of a throat (corresponding to the cross-sectional view taken along C-C of FIG. 4). The typical nozzle vanes 10A', 10B' shown in FIG. 9 each have a shroud-side end surface 11A', 11B', a hub-side end surface 12A', 12B', a leading edge 13A', 13B', a trailing edge 14A', 14B', a pressure surface 15N, 15B', and a suction surface 16A', 16B'.

The suction surface 16A' of the nozzle vane 10A' on the trailing edge side and the pressure surface 15B' of the nozzle vane 10B' on the leading edge side each have a flat shape from the shroud-side end surface 11A', 11B' to the hub-side end surface 12A', 12B'. Accordingly, in the throat 18' formed between the suction surface 16A' of the nozzle vane 10A' on the trailing edge side and the pressure surface 15B' of the nozzle vane 10B' on the leading edge side, a throat width $W_1$ at the position $P_1$ of the shroud-side end surface 11' (first end surface) is substantially equal to a throat with Wm at the middle position Pm between the position $P_1$ of the shroud-side end surface 11' (first end surface) and the position $P_2$ of the hub-side end surface 12' (second end surface).

To achieve a certain flow rate while the opening degree of the nozzle vane is decreased in the turbocharger, a certain throat area is necessary in the throat formed between the adjacent nozzle vanes.

When the typical nozzle vanes 10A', 10B' as shown in FIG. 9 is used as the nozzle vanes, the throat 18' formed between the nozzle vanes 10A', 10B' has substantially the same throat width $W_1$ at the position $P_1$ of the shroud-side end surface 11' facing the clearance as the throat with Wm at the middle position Pm.

Accordingly, even in an operating condition where the nozzle vanes have a small opening degree, the throat width $W_1$ is relatively large, and exhaust gas flow (throat flow) passing near the clearance in the throat 18' between the nozzle vanes 10A', 10B' is not suppressed so much. Therefore, swirl easily occurs due to interaction between the throat flow and exhaust gas flow (clearance flow) passing through the clearance formed between a wall surface (shroud-side wall surface or hub-side wall surface) forming the exhaust gas flow path and the nozzle vane 10A' or 10B' thus reducing turbine efficiency.

In this regard, the throat 18 formed between the nozzle vanes 10A, 10B according to the embodiments shown in FIGS. 5 to 7 has a narrower throat width $W_1$ at the position $P_1$ of the shroud-side end surfaces 11A, 11B facing the clearance than a throat width Wm at the middle position Pm.

That is, since the throat 18 has a relatively narrow throat width $W_1$ on the side of the shroud-side end surfaces 11A, 11B (first end surface) of the nozzle vanes 10A, 10B, it is possible to reduce exhaust gas flow (throat flow) passing on the first end surface side, the side of the shroud-side end surfaces 11A, 11B of the throat 18 (i.e., near the clearance). Thus, it is possible to suppress swirl caused by interaction between the throat flow and the clearance flow. Further, since the throat 18 has a relatively wide throat width Wm in the vicinity of the middle position Pm, it is possible to ensure a throat area even if the nozzle vanes 10A, 10B have a small opening degree, and it is possible to ensure a sufficient flow rate of exhaust gas flowing between the nozzle vanes 10A, 10B.

Accordingly, as shown in FIGS. 5 to 7, when the throat width $W_1$ at the position $P_1$ of the shroud-side end surfaces 11A, 11B (first end surface) is narrower than the throat width Wm at the middle position Pm, even if the nozzle vanes 10A, 10B have a small opening degree, it is possible to reduce swirl caused due to interaction between the throat flow and the clearance flow of exhaust gas while ensuring the flow rate of exhaust gas passing through the throat 18. Thus, it is possible to improve turbine efficiency when the nozzle vanes 10A, 10B have a small opening degree.

In some embodiments, as shown in FIGS. 5 to 7, the throat width of the throat 18 formed between the nozzle vanes 10A, 10B monotonically increases with an increase in a distance from the position $P_1$ of the shroud-side end surface 11, from the position $P_1$ of the shroud-side end surface 11 (first end surface) toward the middle position Pm.

In this case, the throat width between the position $P_1$ of the shroud-side end surface 11 (first end surface) and the middle position Pm is the narrowest at the position $P_1$ of the shroud-side end surface 11 and gradually increases from shroud-side end surface 11 toward the middle position Pm. Thereby, it is possible to effectively reduce exhaust gas flow passing through the throat 18 on the side of the shroud-side end surface 11 (first end surface) facing the clearance while ensuring the throat area. Accordingly, it is possible to effectively reduce swirl caused due to interaction between the throat flow and the clearance flow of exhaust gas while ensuring the flow rate of exhaust gas passing through the throat 18.

In some embodiments, as shown in FIGS. 5 to 7, the suction surface 16 on the trailing edge 14 side of the nozzle vane 10 has, in a cross-section including the normal direction of the camber line Lc of the nozzle vane 10 and the vane height direction, a concave shape at least from the position $P_1$ of the shroud-side end surface 11 (first end surface) to the middle position Pm.

Since FIGS. 5 to 7 are cross-sectional views at the position of the throat 18 between the two nozzle vanes 10A, 10B, some cross-sections possibly do not include the normal direction of the camber line Lc of the nozzle vanes 10A, 10B in a strict sense. However, in a region where the nozzle vanes 10A, 10B have a small opening degree, such cross-sections align with the normal direction of the camber line Lc.

In this case, since the suction surface 16A on the trailing edge 14 side of the nozzle vane 10 has a concave shape from the position $P_1$ of the shroud-side end surface 11 (first end surface) to the middle position Pm, the throat 18 formed by this suction surface 16A and the pressure surface 15B on the leading edge 13B side of the nozzle vane 10B is likely to have a narrower throat width $W_1$ at the position $P_1$ than the throat width Wm at the middle position Pm. Accordingly, even when the nozzle vanes 10 have a small opening degree, it is possible to effectively reduce swirl caused due to interaction between the throat flow and the clearance flow of exhaust gas while ensuring the flow rate of exhaust gas passing through the throat 18.

In some embodiments, as shown in FIGS. 5 and 7, the pressure surface 15 on the leading edge 13 side of the nozzle vane 10 has, in a cross-section including the normal direction of the camber line Lc of the nozzle vane 10 and the vane height direction, a convex shape at least from the position $P_1$ of the shroud-side end surface 11 (first end surface) to the middle position Pm. Further, the radius $RC_T$ of curvature of the concave shape of the suction surface 16 on the trailing edge 14 side is smaller than the radius $RC_L$ of curvature of the convex shape of the pressure surface 15 on the leading edge 13 side.

In this case, since the radius $RC_T$ of curvature of the concave shape of the suction surface 16A on the trailing edge 14A side of the nozzle vane 10A is smaller than the radius $RC_L$ of curvature of the convex shape of the pressure surface 15B on the leading edge 13B side of the nozzle vane 10B from the position $P_1$ of the shroud-side end surface 11 (first end surface) to the middle position Pm, the throat width $W_1$ at the position $P_1$ is narrower than the throat width Wm at the middle position Pm. Accordingly, even when the nozzle vanes 10 have a small opening degree, it is possible to effectively reduce swirl caused due to interaction between the throat flow and the clearance flow of exhaust gas while ensuring the flow rate of exhaust gas passing through the throat 18.

Figure 8A:
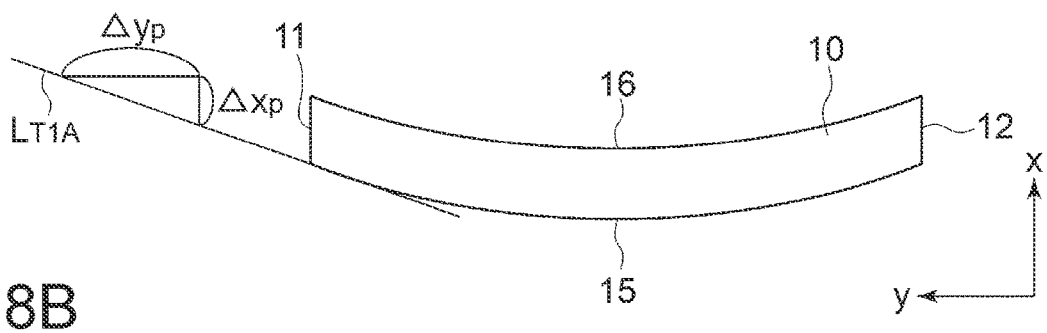
FIG. 8A is a diagram showing a cross-section of the nozzle vane shown in FIG. 3A on the leading edge side in an xy coordinate system.
Figure 8B:
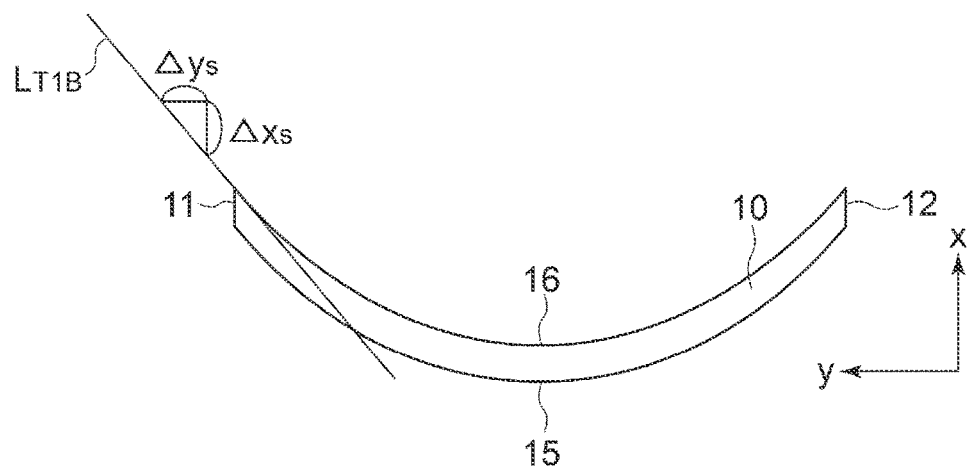
FIG. 8B is a diagram showing a cross-section of the nozzle vane shown in FIG. 3A on the trailing edge side in an xy coordinate system.

FIGS. 8A and 8B are diagrams showing the cross-section of the nozzle vane 10 shown in FIG. 3A (i.e., the nozzle vane 10 shown in FIG. 5) on the leading edge 13 side and the cross-section of the same on the trailing edge 14 side, respectively, in an xy coordinate system, which correspond to FIGS. 3B and 3C, respectively. In the xy coordinate system of FIGS. 8A and 8B, the x-axis is taken along the normal direction of the camber line Lc (see FIG. 3A) of the nozzle vane 10 from the pressure surface 15 toward the suction surface 16 of the nozzle vane 10; the y-axis is taken along the vane height direction from the hub-side end surface 12 (second end surface) toward the shroud-side end surface (first end surface).

The straight line $L_{T1A}$ in FIG. 8A is a line showing the slope of coordinates $(x_p, y_p)$ of the pressure surface 15 on the leading edge 13 side at the position of the shroud-side end surface 11 (first end surface). The straight line $L_{T1B}$ in FIG. 8B is a line showing the slope of coordinates $(x_s, y_s)$ of the suction surface 16 on the trailing edge 14 side at the position of the shroud-side end surface 11 (first end surface).

In some embodiments, as shown in FIGS. 8A and 8B, in the above xy coordinate system, the slope ($dy_s/dx_s$) (see FIG. 8B) of the coordinates ($x_s$, $y_s$) of the suction surface 16 on the trailing edge 14 side of the nozzle vane 10 is smaller than the slope ($dy_p/dx_p$) (see FIG. 8A) of the pressure surface 15 on the leading edge 13 side of the nozzle vane 10 within the positional range in the vane height direction (y-axis direction) including the shroud-side end surface 11 (first end surface).

Although not illustrated, the same applies to the nozzle vane 10 according to the embodiments shown in FIGS. 6 and 7 as the case shown in FIGS. 8A and 8B; i.e., in the above xy coordinate system, the slope ($dy_s/dx_s$) of the coordinates ($x_s$, $y_s$) of the suction surface 16 on the trailing edge 14 side of the nozzle vane 10 is smaller than the slope ($dy_p/dx_p$) of the pressure surface 15 on the leading edge 13 side of the nozzle vane 10 within the positional range in the vane height direction (y-axis direction) including the shroud-side end surface 11 (first end surface).

In this case, the throat 18 (see FIG. 4 and FIGS. 5 to 7) formed between the nozzle vanes 10 has a narrower throat width at the position of the shroud-side end surface 11 (first end surface) of the nozzle vane 10 facing the clearance than a throat width at a position close to the hub-side end surface 12 (second end surface) with respect to the shroud-side end surface 11.

That is, since the throat 18 has a relatively narrow throat width at the position of the shroud-side end surface 11 (first end surface) of the nozzle vane 10, it is possible to reduce exhaust gas flow (throat flow) passing on the side of the shroud-side end surface 11 (first end surface) in the throat 18. Thus, it is possible to suppress swirl caused by interaction between the throat flow and the clearance flow. Further, since the throat 18 has a relatively wide throat width at a position close to the hub-side end surface 12 (second end surface) with respect to the shroud-side end surface 11, it is possible to ensure the throat area even if the nozzle vanes 10 have a small opening degree, and it is possible to ensure a sufficient flow rate of exhaust gas flowing between the nozzle vanes 10.

Accordingly, even if the nozzle vanes 10 have a small opening degree, it is possible to reduce swirl caused due to interaction between the throat flow and the clearance flow of exhaust gas while ensuring the flow rate of exhaust gas passing through the throat 18. Thus, it is possible to improve turbine efficiency when the nozzle vanes 10 have a small opening degree.

Embodiments of the present invention were described in detail above, but the present invention is not limited thereto, and various amendments and modifications may be implemented.

Further, in the present specification, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

REFERENCE SIGNS LIST

1 Turbocharger
2 Turbine housing
3 Rotational shaft
4 Hub
5 Blade
6 Turbine wheel
7 Flow path
8 Outlet
9 Rotatable shaft
10, 10A, 10B Nozzle vane (Vane body)
11, 11A, 11B Shroud-side end surface
12, 12A, 12B Hub-side end surface
13, 13A, 13B Leading edge
14, 14A, 14B Trailing edge
15, 15A, 15B Pressure surface
16, 16A, 16B Suction surface
18 Throat
22 Hub-side wall surface
24 Shroud-side wall surface
26 Turbine
28 Scroll flow path
C Clearance
G Exhaust gas
Lc Camber line

The invention claimed is:

1. A turbocharger comprising:
a turbine wheel;
a hub-side wall surface and a shroud-side wall surface which face each other and which together form a flow path for exhaust gas to flow into the turbine wheel; and
a plurality of nozzle vanes each of which is rotatably disposed on one of the hub-side wall surface or the shroud-side wall surface in the flow path,
wherein a throat formed between adjacent two of the plurality of nozzle vanes has a narrower throat width at a position of a first end surface of each of the adjacent two nozzle vanes facing the other of the hub-side wall surface or the shroud-side wall surface than a throat width at a middle position between the first end surface and a second end surface on an opposite side to the first end surface of each of the adjacent two nozzle vanes,
wherein the throat is formed between a suction surface on a trailing edge side of one of the adjacent two of the plurality of nozzle vanes and a pressure surface on a leading edge side of the other of the adjacent two of the plurality of nozzle vanes,
wherein the suction surface on the trailing edge side has, in a cross-section including a normal direction of a chamber line of the nozzle vane and a vane height direction, a concave shape at least from the position of the first end surface to the middle position,
wherein the pressure surface on the leading edge side has, in a cross-section including the normal direction and the vane height direction, a convex shape at least from the position of the first end surface to the middle position, and wherein a radius of curvature of the concave shape of the suction surface on the trailing edge side is smaller than a radius of curvature of the convex shape of the pressure surface on the leading edge.

2. The turbocharger according to claim 1, wherein the throat width monotonically increases with an increase in a distance from the position of the first end surface toward the middle position.

3. A turbocharger, comprising:
a turbine wheel;
a hub-side wall surface and a shroud-side wall surface which face each other and which together form a flow path for exhaust gas to flow into the turbine wheel; and
a plurality of nozzle vanes each of which is rotatably disposed on one of the hub-side wall surface or the shroud-side wall surface in the flow path,
wherein a throat formed between adjacent two of the plurality of nozzle vanes has a narrower throat width at a position of a first end surface of each of the adjacent two nozzle vanes facing the other of the hub-side wall surface or the shroud-side wall surface than a throat width at a middle position between the first end surface and a second end surface on an opposite side to the first end surface of each of the adjacent two nozzle vanes,
wherein when an x-axis is taken along a normal direction of a camber line of the nozzle vane from a pressure surface toward a suction surface of the nozzle vane, and a y-axis is taken along a vane height direction from the second end surface toward the first end surface, coordinates $(x_s, y_s)$ of the suction surface on a trailing edge side of the nozzle vane and coordinates $(x_p, y_p)$ of the pressure surface on a leading edge side of the nozzle vane satisfy the following relational expression within a positional range in the vane height direction including the first end surface:

$$\frac{dy_s}{dx_s} < \frac{dy_p}{dx_p}.$$

4. A nozzle vane for a turbocharger, comprising
a vane body having a first end surface and a second end surface; and
a rotatable shaft to rotate the vane body, the rotatable shaft being disposed on the second end surface,
wherein when an x-axis is taken along a normal direction of a camber line of the vane body from a pressure surface toward a suction surface of the vane body, and a y-axis is taken along a vane height direction from the second end surface toward the first end surface, coordinates $(x_s, y_s)$ of the suction surface on a trailing edge side of the vane body and coordinates $(x_p, y_p)$ of the pressure surface on a leading edge side of the vane body satisfy the following relational expression within a positional range in the vane height direction including the first end surface:

$$\frac{dy_s}{dx_s} < \frac{dy_p}{dx_p}.$$

5. The nozzle vane for a turbocharger according to claim 4, wherein the suction surface on the trailing edge side has, in a cross-section including the normal direction of the camber line and the vane height direction, a concave shape at least from a position of the first end surface to a middle position between the first end surface and the second end surface.

6. The nozzle vane for a turbocharger according to claim 5, wherein the pressure surface on the leading edge side has, in a cross-section including the normal direction and the vane height direction, a convex shape at least from the position of the first end surface to the middle position, and
wherein a radius of curvature of the concave shape of the suction surface on the trailing edge side is smaller than a radius of curvature of the convex shape of the pressure surface on the leading edge.

7. A turbine, comprising:
a nozzle vane according to claim 4; and
a turbine wheel disposed on a downstream side of the nozzle vane.

8. A turbocharger, comprising:
a turbine wheel;
a hub-side wall surface and a shroud-side wall surface which face each other and which together form a flow path for exhaust gas to flow into the turbine wheel; and
a plurality of nozzle vanes according to claim 6, each of which is rotatably disposed in the flow path.

* * * * *